US011181254B2

(12) United States Patent
Pavitt et al.

(10) Patent No.: US 11,181,254 B2
(45) Date of Patent: Nov. 23, 2021

(54) COMPACT EMERGENCY LIGHTING DEVICE WITH BROAD-RANGE LIGHTING ADJUSTABILITY

(71) Applicant: EVENLITE, INC., Trevose, PA (US)

(72) Inventors: Adrian V. Pavitt, Newtown, PA (US); Timothy J. Lawlor, Philadelphia, PA (US)

(73) Assignee: EVENLITE, INC., Trevose, PA (US)

( * ) Notice: Subject to any disclaimer, the term of this patent is extended or adjusted under 35 U.S.C. 154(b) by 0 days.

(21) Appl. No.: 16/857,970

(22) Filed: Apr. 24, 2020

(65) Prior Publication Data

US 2020/0340648 A1 Oct. 29, 2020

Related U.S. Application Data

(60) Provisional application No. 62/839,054, filed on Apr. 26, 2019, provisional application No. 62/869,862, filed on Jul. 2, 2019.

(51) Int. Cl.
*F21V 19/02* (2006.01)
*F21S 9/02* (2006.01)
(Continued)

(52) U.S. Cl.
CPC .............. *F21V 19/02* (2013.01); *F21S 8/033* (2013.01); *F21S 9/022* (2013.01); *F21V 15/01* (2013.01);
(Continued)

(58) Field of Classification Search
CPC F21S 9/022; F21S 8/033; F21V 21/34; F21V 21/14; F21V 21/30; F21V 19/02; F21V 14/02

See application file for complete search history.

(56) References Cited

U.S. PATENT DOCUMENTS 3,772,527 A * 11/1973 Darling ................... F21V 21/02
307/66
5,599,089 A * 2/1997 Sheu ..................... F21V 17/007
362/198
(Continued)

OTHER PUBLICATIONS

Dual Lite "EV4D-02WAL Series Architectural LED Emergency Light," Specsheet Mar. 2019, downloaded from https://hubbellcdn.com/specsheet/DL_EV4D-02WAL_SPEC.pdf.
(Continued)

*Primary Examiner* — William N Harris
(74) *Attorney, Agent, or Firm* — FisherBroyles, LLP

(57) ABSTRACT

A lighting device having small light sources on a movable support assembly. Light sources are integrated into the side edges of the device on an assembly that coincides with the housing shape, to provide a particularly narrow and low-profile arrangement. Lights sources may be arranged in an array on a common printed circuit board. Optic elements are included to redirect and focus light. The light support assembly may be pivotable, translatable and tiltable to allow for adjustment to enhance lighting uniformity in multiple directions. Accordingly, a single device can accommodate a broad range of lighting needs, the undesirable "bug eye" appearance is avoided in many situations, and even when the support assembly is tilted/rotated, the mounting of the lighting arrays on the sides, and the turning and/or tilting of the lighting arrays predominantly within the envelope of the housing contributes to avoidance of an undesirable "bug eye" appearance.

33 Claims, 18 Drawing Sheets

(51) Int. Cl.

| | |
|---|---|
| *F21V 23/00* | (2015.01) |
| *F21V 17/16* | (2006.01) |
| *F21S 8/00* | (2006.01) |
| *F21V 23/02* | (2006.01) |
| *F21V 21/02* | (2006.01) |
| *F21V 15/01* | (2006.01) |
| *F21Y 115/10* | (2016.01) |
| *F21Y 103/10* | (2016.01) |
| *H02J 7/02* | (2016.01) |

(52) U.S. Cl.
CPC ............. *F21V 17/16* (2013.01); *F21V 21/02* (2013.01); *F21V 23/006* (2013.01); *F21V 23/009* (2013.01); *F21V 23/02* (2013.01); *F21Y 2103/10* (2016.08); *F21Y 2115/10* (2016.08); *H02J 7/02* (2013.01); *H02J 2207/20* (2020.01)

(56) References Cited

U.S. PATENT DOCUMENTS

| | | | | |
|---|---|---|---|---|
| 5,797,673 | A * | 8/1998 | Logan | G09F 13/04 362/20 |
| 6,142,649 | A * | 11/2000 | Beghelli | F21S 9/022 362/259 |
| 7,147,348 | B2 * | 12/2006 | Heaton | F21S 9/022 362/249.07 |
| 7,182,487 | B1 | 2/2007 | Pickard | |
| 7,220,014 | B2 | 5/2007 | Lay | |
| 7,296,908 | B1 | 11/2007 | Pickard | |
| 8,911,134 | B2 * | 12/2014 | Hsu | G09F 13/22 362/613 |
| 9,752,739 | B2 | 9/2017 | Holscher | |
| 9,995,448 | B2 | 6/2018 | Brunelli | |
| 10,808,919 | B1 * | 10/2020 | Chen | F21V 15/01 |
| 2006/0215403 | A1 | 9/2006 | Martineau | G09F 19/22 362/240 |
| 2008/0232102 | A1 * | 9/2008 | Martineau | F21V 7/04 362/235 |
| 2008/0276509 | A1 * | 11/2008 | Yu | G09F 19/22 40/570 |
| 2012/0174448 | A1 * | 7/2012 | Lee | F21V 33/0076 40/570 |
| 2016/0305637 | A1 * | 10/2016 | Brunelli | F21V 21/30 |
| 2017/0270836 | A1 * | 9/2017 | Kim, II | G08B 7/062 |

OTHER PUBLICATIONS

Je Woo Corporation, Ltd., "Specification Sheet for LED Emergency Lighting (for America market) M4 Series," 2018, 6 pages.

LEDR-2 "LED Adjustable Optics Thermoplastic Emergency Unit," no date, 1 page.

Lithonia Lighting "Quantum Contemporary Commercial LED Emergency Light" Features & Specifications, and Installation Instructions Jan. 15, 2018, downloaded Jun. 2019 from http://www.acuitybrandslighting.com/Library//II/documents/specsheets/elm2l_elm2lf.pdf.

* cited by examiner

COMPACT EMERGENCY LIGHTING DEVICE WITH BROAD-RANGE LIGHTING ADJUSTABILITY

CROSS-REFERENCE TO RELATED APPLICATIONS

This application claims the benefit of priority, under 35 U.S.C. § 119(e) of U.S. Provisional Patent Application No. 62/839,054, filed Apr. 26, 2019, and U.S. Provisional Patent Application No. 62/869,862, filed Jul. 2, 2019, the entire disclosures of both of which are hereby incorporated herein by reference.

FIELD OF THE INVENTION

The present invention relates generally to an emergency lighting device for path-of-egress lighting, and more particularly, to a compact emergency lighting device providing for a high-degree of adjustability of the lighting elements to provide enhanced uniformity of lighting coverage for a broad range of lighting needs.

BACKGROUND

Emergency lighting devices are required by various standards agencies and building codes to provide illumination to a path of egress from certain buildings and structures upon failure of normal electrical power. These devices contain batteries maintained in a fully charged condition during periods when normal power is present, and which are automatically switched to activate light sources during periods of power failure.

Light sources are normally LEDs, combined with suitable optics, arranged to provide specified levels of illumination over defined areas, providing an illuminated path of egress.

Emergency lights are typically constructed to contain the major components, including input power conversion, battery storage and recharge capabilities, light source and optics, all within one housing to facilitate ease of installation while providing a compact, visually pleasing package.

Devices are usually mounted (on a wall or ceiling) at heights from about 7.5 feet up to about 16 feet above the floor to accommodate typical ceiling heights and paths of egress.

To minimize the number of emergency lights required to illuminate a defined area from a given height, two light sources (to provide lighting redundancy) are often attached to the front of the housing, at or near each end, and they are often mounted so as to be adjustable to allow for aiming of light to optimize the area of lighting coverage.

A commonly used arrangement for providing adjustability for aiming has been to construct the light sources in the form of a spherical ball in a socket. However, this arrangement allows only a limited amount of rotation, which is sufficient only for a narrow range of lighting needs.

Additionally, in this construction, the light sources protrude from the normal outline of the housing shape as bulges, giving the appearance of "bug eyes." Examples of such "bug eye" devices are disclosed in U.S. Pat. No. 7,220,014 to Lay et. al., U.S. Pat. No. 7,296,908 to Pickard et. al., and U.S. Pat. No. 9,752,739 to Holscher et. al. These emergency lighting devices are generally suitable for lighting purposes. However, these devices are typically used in an office or business environment, and the protrusion and size of the "bug eye" light sources increase the volume of the housing and detract from the aesthetic appeal.

What is needed is an emergency lighting device providing for a high degree of adjustability of the lighting elements to provide enhanced uniformity of lighting coverage for a broad range of lighting needs, while also being compact and aesthetically appealing for use in office and business environments.

SUMMARY

The present invention provides an emergency lighting device meeting these needs, among others. More particularly, the present invention is directed to an emergency lighting device with LED light sources integrated into the side edges of the device's housing to minimize the size and volume, providing high luminous efficiency over large areas and spacings to obtain uniform path of egress lighting.

In one embodiment, the light source integrated into the side edges of the device may consist of a single LED on each side. In other embodiments, the light source may consist of an array of two, three or more LEDs on each side, to increase the overall quantity of lumens produced. Each array may be provided in a linear format to coincide with the housing shape, and to provide a particularly narrow and low-profile arrangement. By utilizing a linear format, each LED in the array being on the same mounting plane allows a common printed circuit board and heat sinking element to accommodate the array, while providing economy of manufacture and maintaining a compact size and shape to the housing that allows for side-mounting of the lighting arrays, which contributes to avoidance of the undesirable "bug eye" appearance.

Another aspect of the invention is to divert and focus the illumination characteristics of each LED by incorporating a free-form optic element for each LED, thereby allowing its emitted light beam to be focused and redirected downward to either single areas or distributed areas along the path of egress to control the intensity and uniformity. The optic elements could either be separate from each other, or combined into an optical array to match the LEDs. The use of such optic elements for redirecting the light facilitates side-mounting of the lighting arrays, which contributes to avoidance of the undesirable "bug eye" appearance.

Another aspect of the invention is to provide a means to tilt the LED array on each side edge of the housing by an additional 10 degrees off vertical, to enhance uniformity of lighting along the path of egress, adjacent and parallel to the mounting surface, with high device mounting heights.

Even though most paths of egress are adjacent and parallel to the wall on which the emergency lighting device is mounted, there are also applications in which the desired path of egress is perpendicular to the mounting wall, as in areas opposite a door. To satisfy this need, another aspect of the invention is to provide a mechanism for turning the LED array on each side edge of the housing to a forward-facing position to illuminate large areas.

The need for tilting and/or turning of the lighting arrays typically occurs infrequently as compared to the need for illuminating paths of egress that are adjacent and parallel to the mounting wall. Accordingly, a single device can accommodate a broad range of lighting needs, but tilting and turning will not often be needed, and thus the compact size and shape of the device associated with maintenance of the tilting and turning mechanisms in their retracted state can be preserved in most installations, and thus either for storage or for use in such a case, the lighting arrays are positioned in a retracted position on the sides of the housing, such that the front surface of the housing is free from lighting elements, and the undesirable "bug eye" appearance is avoided. Even when used such the lighting arrays are tilted and/or rotated, the mounting of the lighting arrays on the sides, and the turning and/or tilting of the lighting arrays predominantly within the envelope of the housing contributes to avoidance of the undesirable "bug eye" appearance.

BRIEF DESCRIPTION OF THE DRAWINGS

An understanding of the following description will be facilitated by reference to the attached drawings, in which.

DETAILED DESCRIPTION

Figure 1:
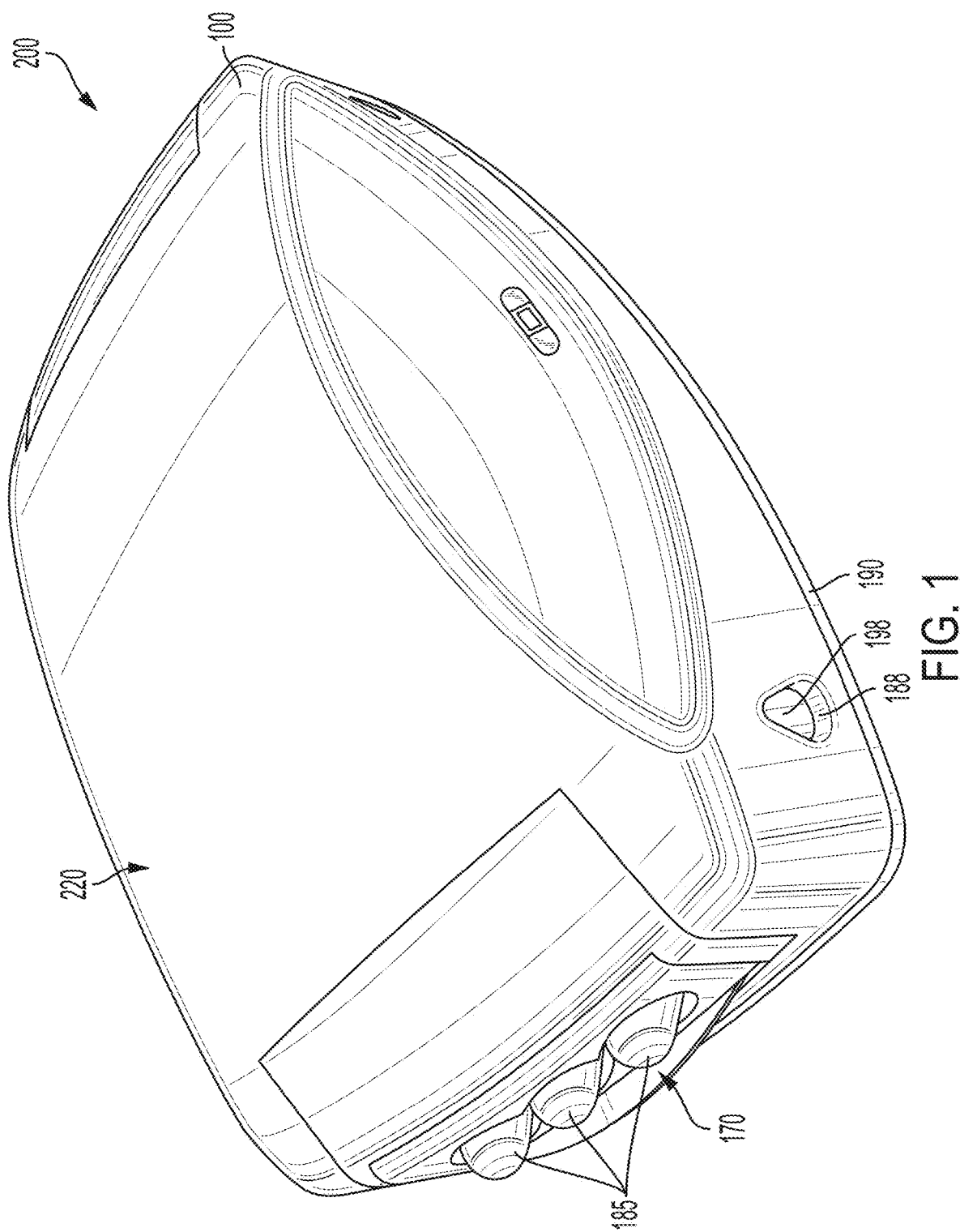
FIG. 1 is a perspective front view of an emergency lighting device including a three-optic lighting array shown in a retracted position, in accordance with an exemplary embodiment of the present invention.
Figure 2:
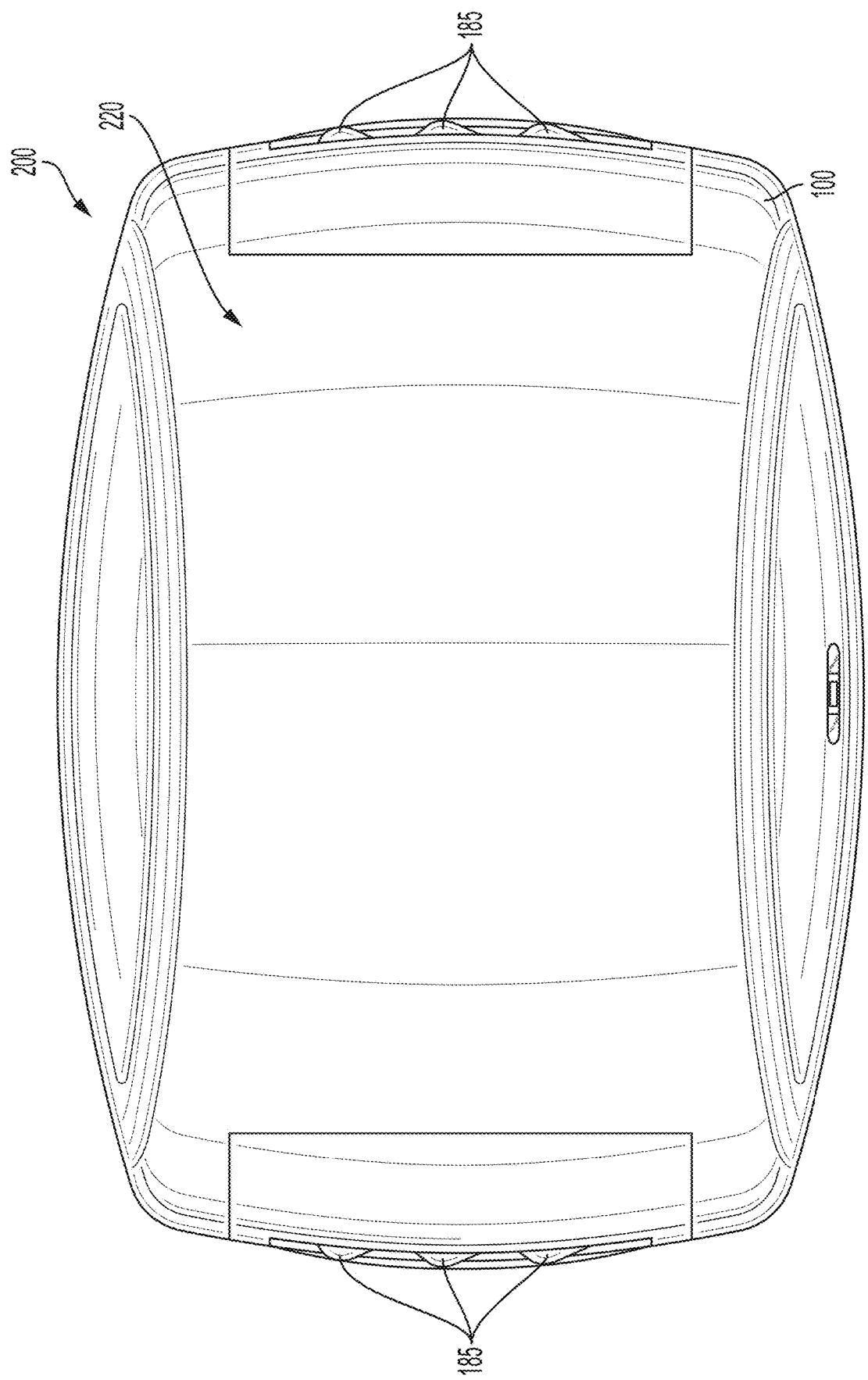
FIG. 2 is a front view of the lighting device as shown in FIG. 1.
Figure 3:
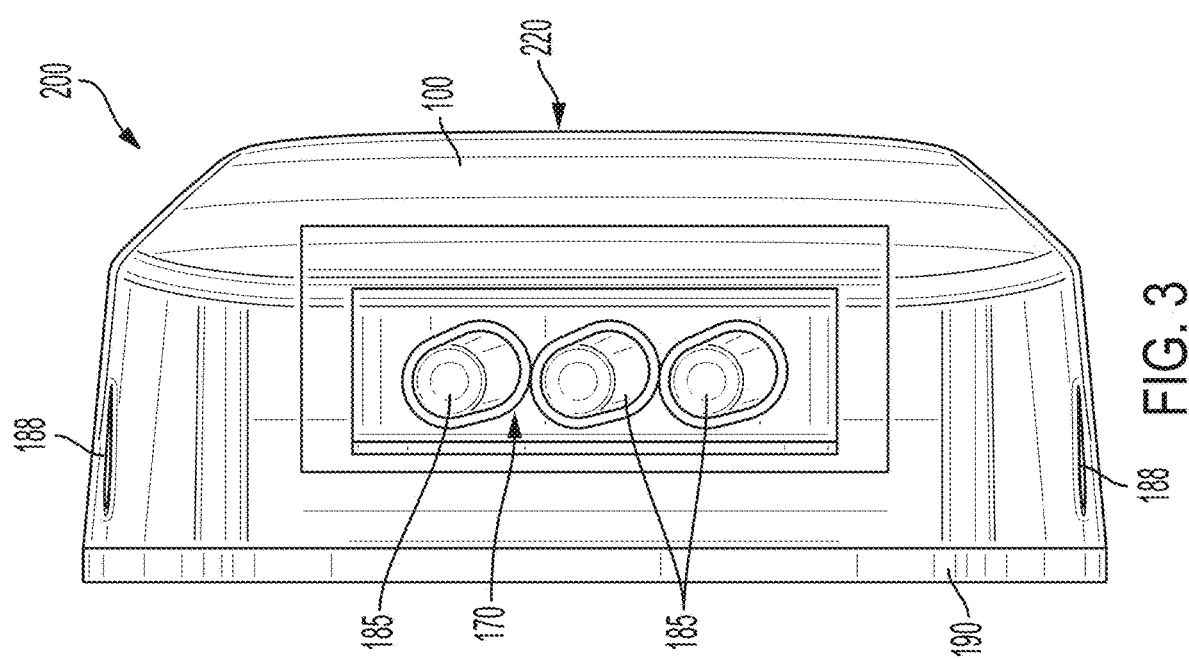
FIG. 3 is a left side view of the lighting device as shown in FIG. 1.
Figure 4:
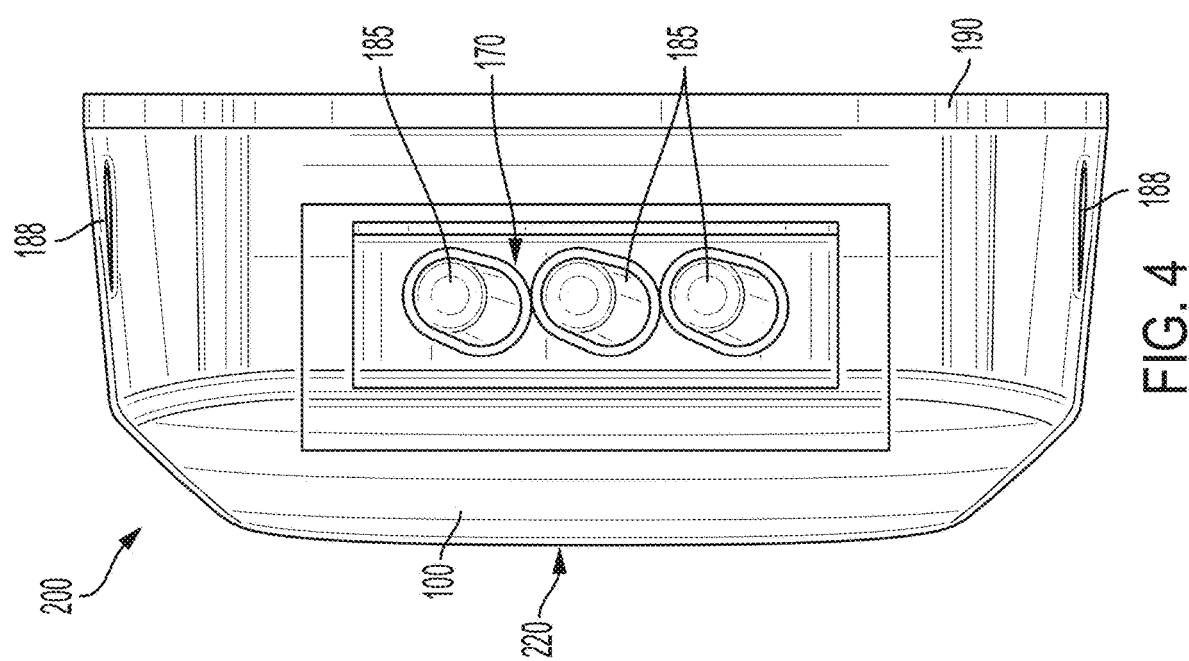
FIG. 4 is a right side view of the lighting device as shown in FIG. 1.
Figure 5:
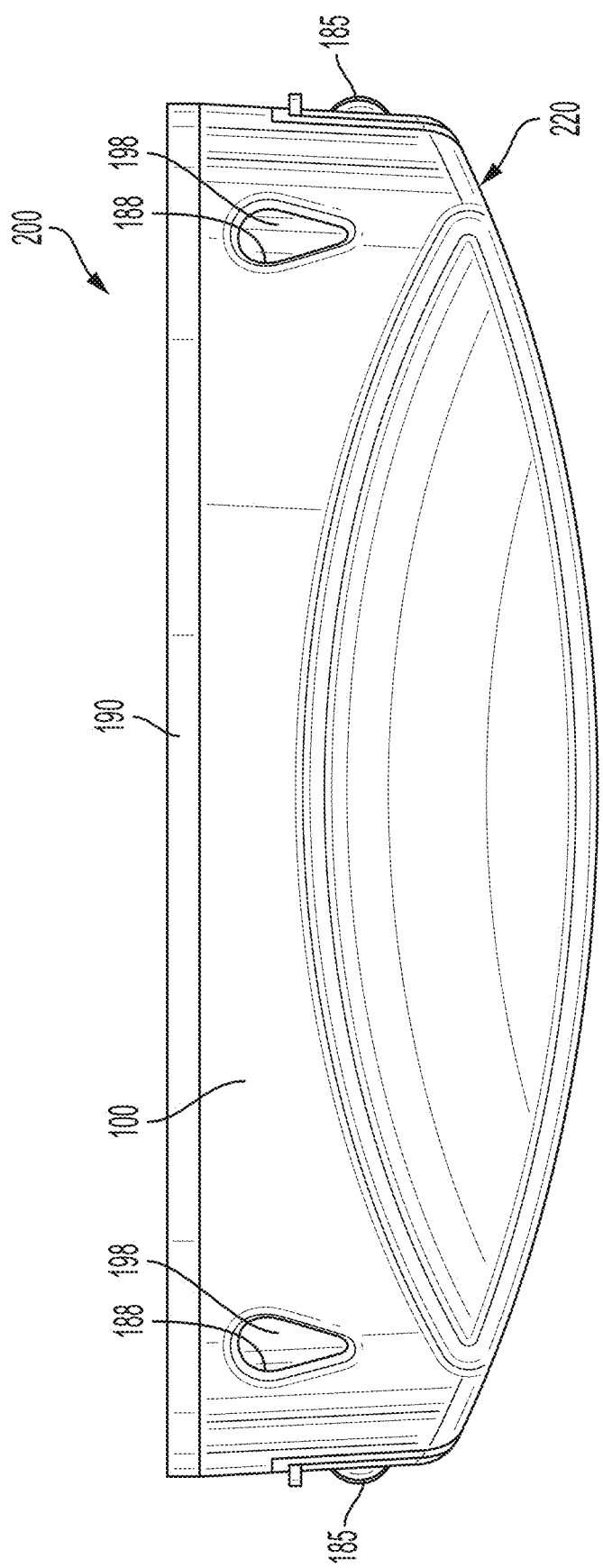
FIG. 5 is a top view of the lighting device as shown in FIG. 1.
Figure 6:
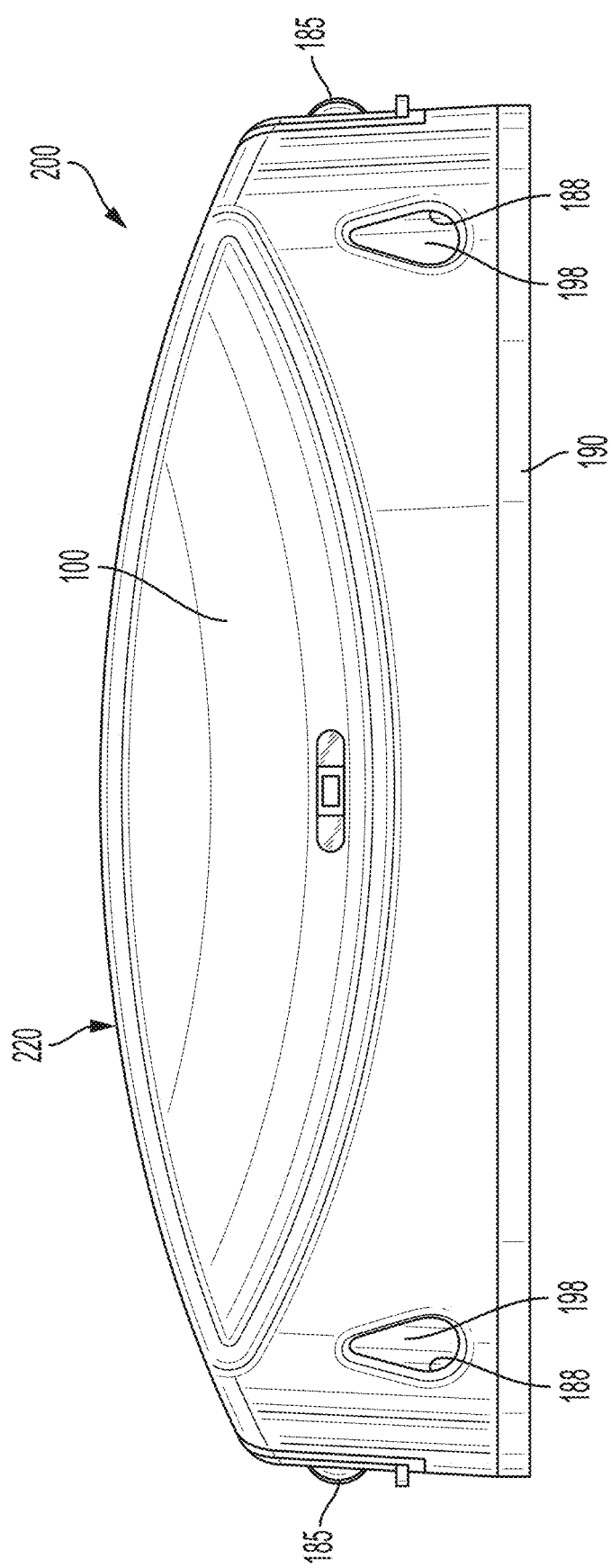
FIG. 6 is a bottom view of the lighting device as shown in FIG. 1.

The present invention provides an emergency lighting device providing for adjustability of the lighting elements to provide enhanced uniformity of lighting coverage for a broad range of lighting needs, while also being compact and aesthetically appealing for use in office and business environments. More particularly, the emergency lighting device has compact light sources/LEDs/lenses integrated into the left- and right-side edges (with reference to the device as it is intended to be positioned in a normal upright mounting position on a wall, although the device can also be mounted on a ceiling) of the device's housing to minimize the overall size and volume of the device, and to make it more aesthetically pleasing for use in office and business environment. Further, the compact light sources are mounted on a highly-adjustable movable structure permitting the light sources to be either retracted, extended/tilted, extended/turned or extended/tilted and turned, using a support assembly that provides three degrees of freedom, namely, a first axis about which the light sources may be turned, a second axis about which the light sources may be translated as they are turned, and a third axis relative to which the light sources may be tilted, the first and third axes being orthogonal to one another. Thus, emergency lighting device provides for a high degree of adjustability of the lighting elements to provide enhanced uniformity of lighting coverage, while still providing high luminous efficiency over large areas and spacings to obtain uniform path of egress lighting. Accordingly, a single device can accommodate a broad range of lighting needs, but tilting and turning will not often be needed, and thus the particularly compact size and shape of the device associated with maintenance of the tilting and turning mechanisms in their retracted state can be preserved in most installations, to retain a front surface of the device that is free from light sources protruding from its front surface, and to avoid an undesirable "bug eye" appearance.

Referring now to FIGS. 1-8, an emergency lighting device 200 in accordance with an exemplary embodiment of the present invention is shown. The exemplary device 200 is constructed to include a main housing 100 and a mounting plate 190. The main housing 100 and mounting plate 190 mate with one another to form the lighting device 200.

Notably, the front surface 220 of the device is substantially smooth and continuous, due to a front surface 220 that is free from any openings for accommodating a light source or lens. Therefore, the housing 100 and the front surface of the lighting device 200 does not support any light source, lens or lighting assembly on the front surface of the housing, and thus does not have the "bug eye" look common to prior art emergency lighting devices. Rather, the device 200 includes lighting assemblies 170 including light sources and optic elements 185 that are small and arranged in groups, preferably in linear arrays, of one, two, three or more on lateral sides of the housing, at least when the device is in a closed position as shown in FIGS. 1-7. Further, the side portions are well defined relative to the front, top and bottom surface, and more particularly, are separated from at least the front portion by a corner region. Thus, no more than a minor portion (e.g., less than 50%, less than 30%, less than 10%, or less than any percentage between 0 and 50%) of the device's light sources/lenses 185 is visible from a front view of the device, when viewed in the closed position as the device is mounted at a normal mounting height (e.g., about 7.5 feet-16 feet) above the floor, as will be appreciated from FIG. 2. Accordingly, the light sources are essentially obscured from view from a normal viewing location (generally below and in front of the device when mounted in the normal operating position), and the "bug eye" appearance is avoided.

Figure 8:
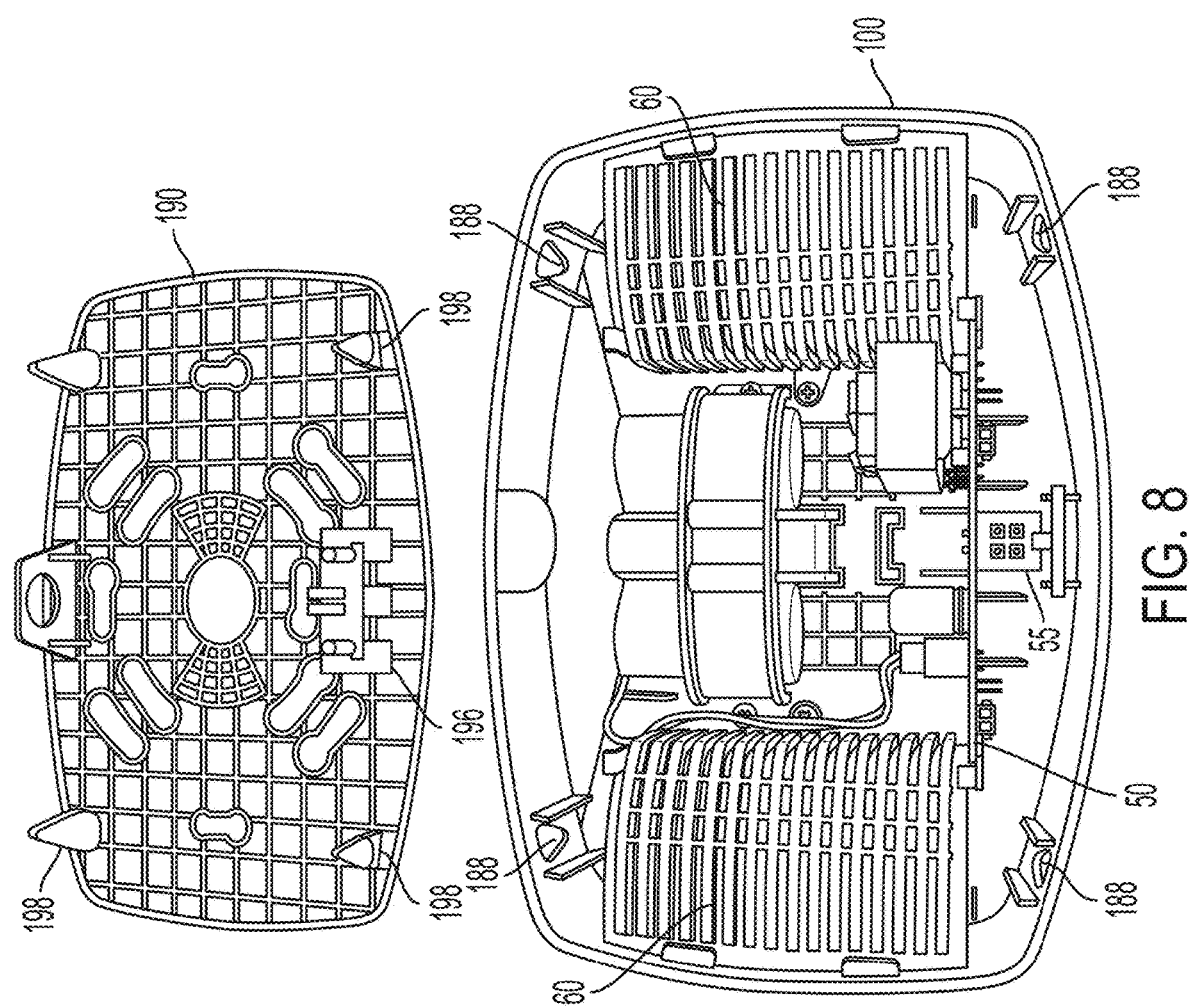
FIG. 8 is a rear elevation of the lighting device of FIG. 1, shown from the rear with the back cover removed from the main housing.
Figure 9:
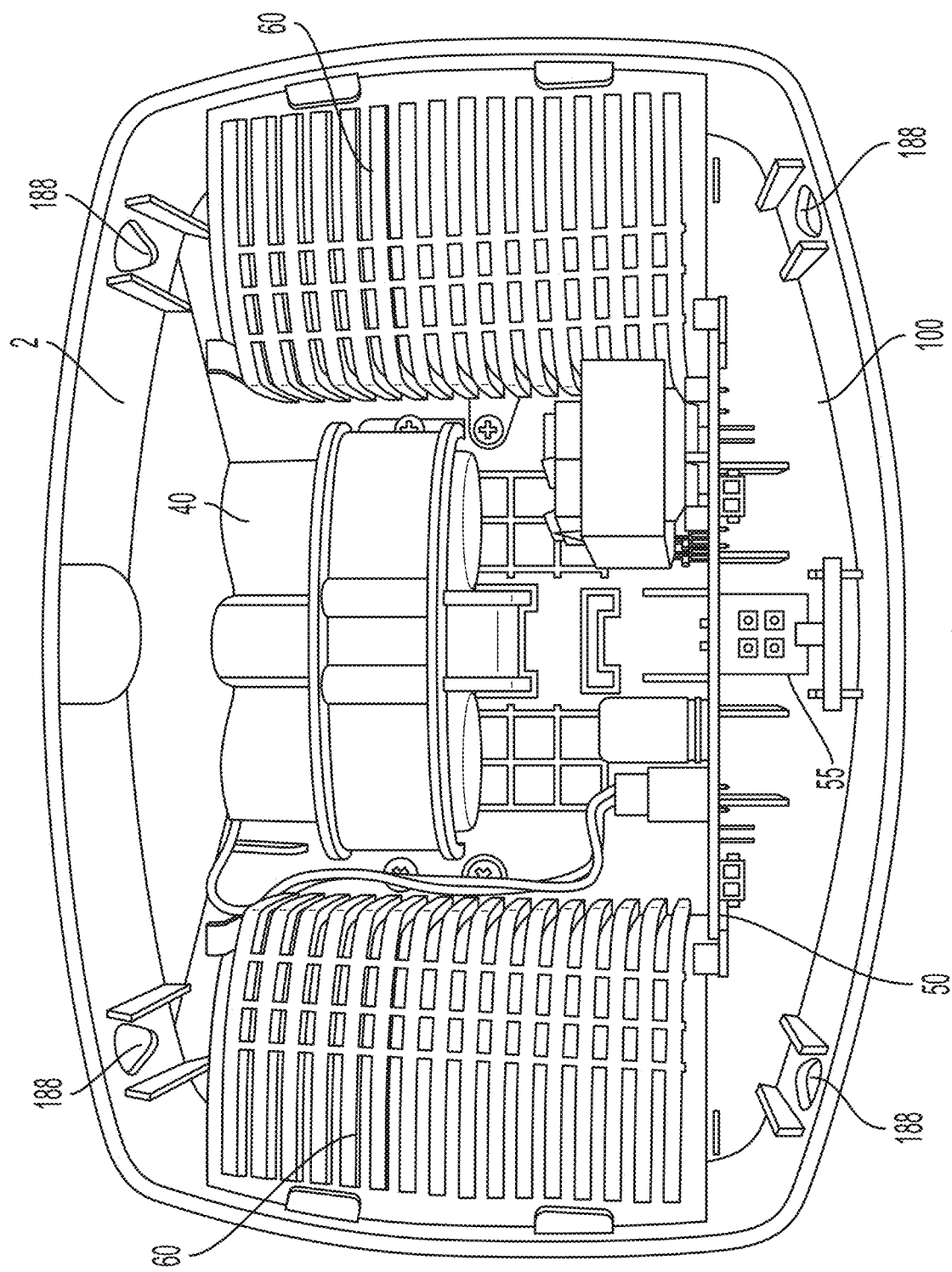
FIG. 9 is a rear elevation of the main housing of the lighting device, showing the internal PCB, transformer and battery.

Referring now to FIGS. 8 and 9, the main housing 100 contains and supports a back-up battery 40 to power the device upon loss of mains power, a printed circuit board 50, which includes an AC to DC converter to charge the battery 40, drive the light sources/LEDs, and control device operation. Shields 60 protect the light sources/LEDs and shield the user from internal voltage and current. The circuit board 50 may include an electrical connector 55. The housing may define openings or other structures 188 for mating with a portion of the mounting plate 190 to form a mechanical connection therewith capable of supporting the housing 100 on the mounting plate 190.

Figure 7:
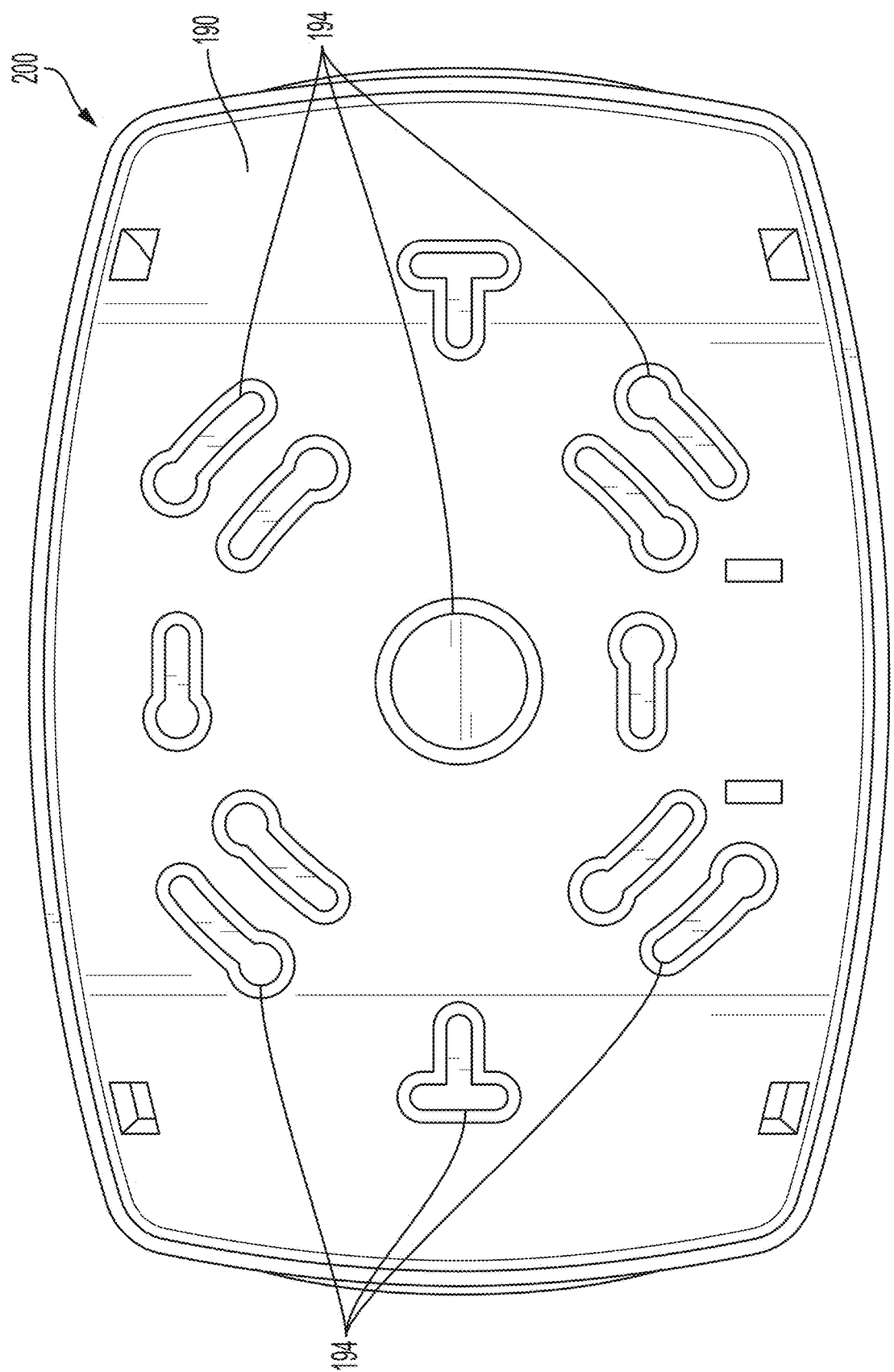
FIG. 7 is a rear view of the lighting device shown in FIG. 1.

Referring now to FIGS. 7 and 8, the mounting plate 190 includes a plurality of holes, or knockouts 194 for making holes, that can be used to mount the mounting plate 190 to a wall or ceiling using screws. The mounting plate 190 may further includes an electrical connector 196 that can be permanently or semi-permanently hardwired to AC wiring of the building in which it is mounted during an initial installation of the lighting device in the building. The mounting plate 190 further includes mounting members 198, e.g., in the form of cantilevered fingers, configured to register with and mate with complementary structures, e.g., openings 188, on the housing 100 to reliably support the housing 100 on the mounting plate.

Figure 10:
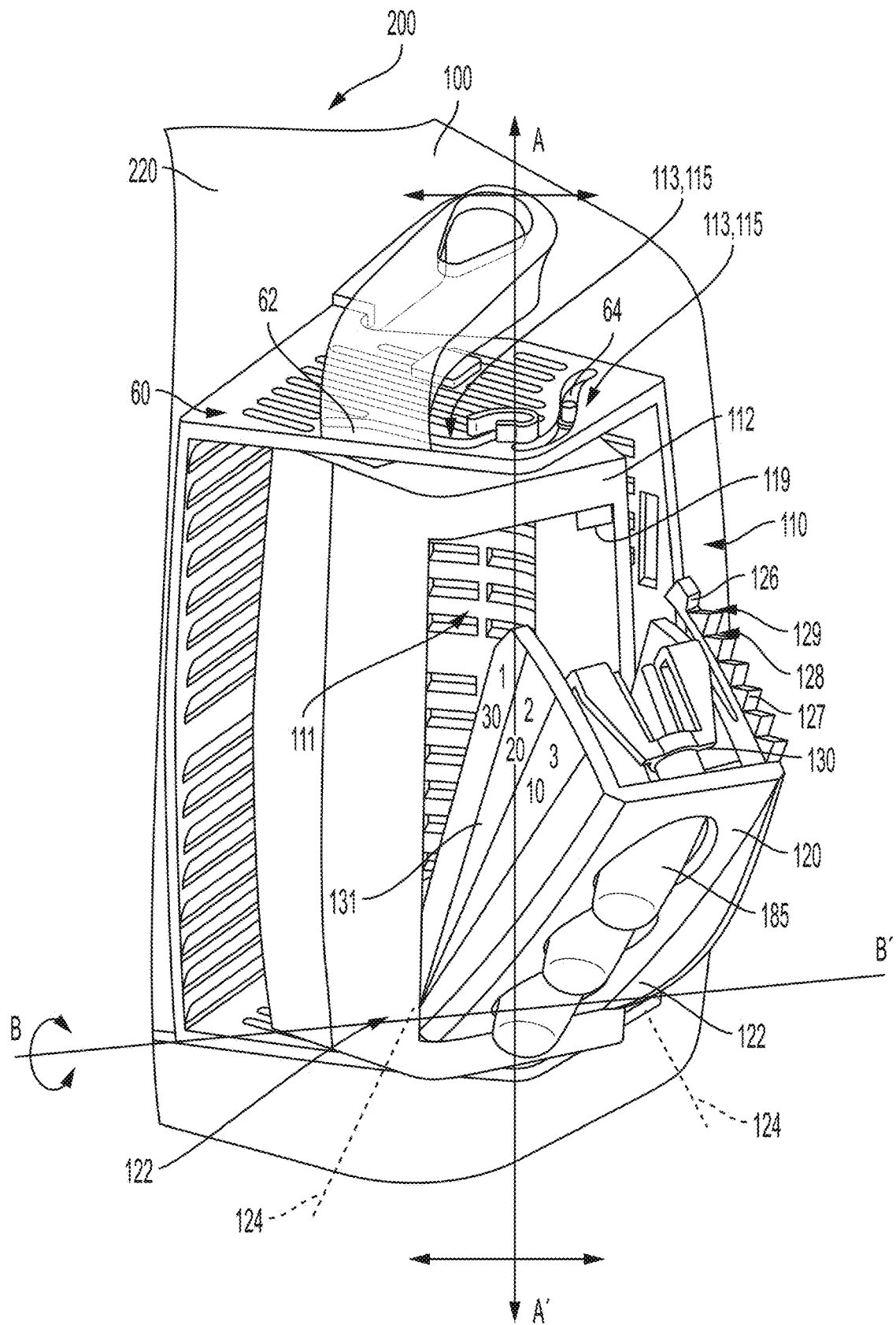
FIG. 10 is a perspective front view of the lighting device of FIG. 1, showing a support mechanism enabling tilt and rotation of the lighting assembly.

Referring now to FIG. 10, a perspective front view of the lighting device of FIG. 1 is shows a portion of the main housing 100 removed/cut away for illustrative purposes to reveal a support assembly 110 enabling tilting and translating-axis "rotation" (or, turning) of a lighting assembly 130 of the lighting device 200, principally within the housing 100. Generally, the support assembly 110 comprises a first carriage (e.g., 112) and a second carriage (e.g., 120), so that both tilting motion and rotating motion of the supported lighting assembly 130 is provided by the support assembly 110.

The first carriage 112 of the support assembly 110 is mounted for rotation-like motion about an axis oriented to be generally vertical when the device 200 is mounted on a vertical wall, and thus the first axis is generally parallel to a plane of the mounting plate 190. This allows each lighting assembly 130 to be adjusted from a first position in which the lighting assembly is pointed and situated generally laterally, to the side of the device 200, to a second position in which the lighting assembly in pointed and situated generally more toward the front of the device 200. However, the first carriage 112 is not mounted by static pivot points for simple rotation about a stationary axis. Rather, the shield 60 and first carriage are provided with complementary mating structures that permit the light sources to be turned from generally sideward-facing to generally frontward-facing positions, but in a manner in which the light sources "rotate" about a generally vertical axis that is not stationary, but rather than moves/translates as the carriage is turned. Any suitable structures for rotatably interconnecting the first carriage 112 with the shield/and/or housing 100 may be employed. Accordingly, rather than enabling simple rotation of the first carriage, a more complex motion is enabled in which the first carriage translates while the light sources are adjusted in angular direction. More particularly, the complex motion enabled permitting the light sources to be adjusted between sideward-facing and frontward-facing positions while causing the first carriage to better remain within an envelope of the main housing than pure rotation would allow. This serves to further avoid the "bug eye" appearance, even when the light sources are rotated more toward a frontward-facing position.

More particularly, in the exemplary embodiment shown in FIG. 10, the first carriage 112 is provided with a pair of eccentrically located pins 113, 115 at its upper and lower ends, as will be appreciated from FIG. 10 (the lower end may be identical to the upper end shown). Further, the shield 60 defines a pair of elongated slots 62, 64 dimensioned to receive the pins 113, 115 (the lower end may be identical to the upper end shown). These slots are elongated and have contours to define the desired motion of the first carriage, while maintaining it in an upright position, as the carriage is "rotated" or turned to vary the sideward- or frontward-position of the light sources. The contours of the slots 62, 64 are configured to decrease the amount by which the first carriage protrudes relative to the main housing, during "rotation"/turning, relative to a simple fixed-axis rotation and/or to generally cause the first carriage to assume positions that are more generally within the envelope of the main housing as the first carriage is "rotated"/turned. More particularly, as the first carriage 112 is turned, the pins 113, 115 ride in and traverse the slots 62, 64, and the contours of the slots define the motion and position of the carriage, to retain the first carriage 112, or a predominant portion of the carriage, within the envelope of the housing 100. Further, it will be appreciated that the pins and slots are housed with the envelope of the main housing. Thus, the first carriage tends to turn/rotate substantially within, rather than protruding externally to, an envelope of the housing, which has generally smooth front with no localized openings or bulges for accommodating light sources/assemblies that would give the device a "bug eye" appearance. The shield 60 is formed with or supported on and/or in the housing 100, such that the first carriage 112 rides within an internal area of the housing 100 defined at least in part by the shield 60, so that the user is shielded from the first carriage 112 and associated electrical wiring by the shield 60 when the housing 100 is not assembled to the mounting plate 190. Preferably, the first carriage 112 allows the light sources to be positioned through a range of travel of at least 60, at least 90, or at least 120 degrees. In this embodiment, the first carriage 112 defines an opening 111 for receiving a second carriage.

As noted above, the support assembly 110 further comprises a second carriage 120 mounted to tilt about an axis BB' that is oriented to be generally horizontal when the device 200 is mounted on a vertical wall, and thus the second axis is generally perpendicular to the translating axis AA' of the first carriage 112. Accordingly, the second carriage 120 is tiltably supported on the housing 100 about a horizontally-extending axis extending across a width or depth of the device 200. More particularly, a pair of pivot points (e.g., pins) for the second carriage 120 are located within an envelope of the outer surface of the housing 100. In this particular embodiment, the second carriage 120 is mounted to the first carriage 112, such that the second carriage 120 rides within an internal area defined by the first carriage 112, so that the user is shielded from the second carriage 120 and associated electrical wiring by the first carriage 112 and the shield 60 when the housing 100 is not assembled to the mounting plate 190. Preferably, the second carriage 120 is rotatable about axis BB' through at least 10, at least 30, or at least 45 degrees.

In the exemplary embodiment, the second carriage 120 is rotatably supported on the first carriage 112, shield 60 and housing 100 by way of left and right pivot pins 122 formed on the second carriage 120, toward its lower end, that are dimensioned to be received within complementary openings 124 defined on the first carriage 112. In the exemplary embodiment, each opening 124 is defined as an open-ended slot defined in part by a cantilevered finger (not shown) that is designed to be displaced by a pivot pin 122 as it is inserted into the slot 124, and then to resile to capture and retain the pivot pin 122 within the slot 124. However, any suitable structures for tiltably interconnecting the second carriage 112 with the housing 100 may be employed. Toward an upper end of the second carriage, the second carriage 120 includes a catch 126 for permitting, but limiting, tilting of the second carriage 120 relative to the first carriage 112/housing 100. In the exemplary embodiment, the catch 126 is formed integrally with the second carriage 120 as a cantilevered finger 128 having a shoulder 129 towards its distal end. Accordingly, the cantilevered finger 128 may be deflected to allow the second carriage 120 to be inserted into the opening 111 of the first carriage/housing during initial assembly, and then may be permitted to resile so that the finger 128 rides within the opening of the first carriage 112/housing during tilting of the second carriage 120 relative to the first carriage 112/housing, and such that the shoulder 129 catches on the first carriage 112/housing at an angle of desired maximum tilt, to limit the tilting movement of the second carriage 120 relative to the first carriage 112/housing 100.

In the exemplary embodiment shown, the cantilevered finger 128 of the second carriage 120 further defines a row of teeth or other detents 127, and the first carriage 112 defines a rib 119 or other detect configured to engage the teeth as the second carriage 120 is tilted. Further, the side 131 may be provided with printed, molded-in, or molded-on or other markings, e.g., lines, showing degrees of tilt or position, each with unique indicia such as a numerical angular indication or a numerical position indication, and the teeth are configured to stop the tilting of the second carriage 120 at each of the markings for each indicated angular position. During installation, these teeth and markings can be used to advantage to position the second carriage 120 at a desired or indicated (e.g., in an associated printed installation manual) angle of tilt, and to retain the carriage in the selected position via the engagement of the detents.

Figure 11:
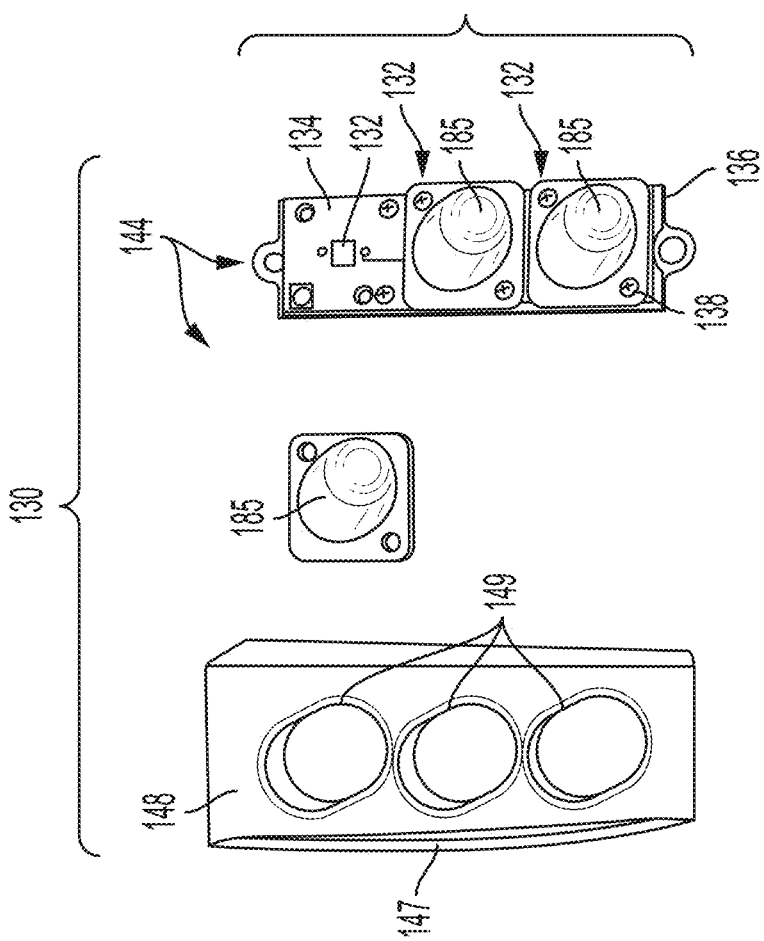
FIG. 11 is an exploded view of one of the linear lighting assemblies of the lighting device of FIG. 1.

Referring now to FIGS. 10 and 11, each of the second carriages 120 supports a respective lighting assembly 130 that will be used for the path-of-egress lighting. In one embodiment, a single lighting assembly 130 includes a single light source. In another embodiment, a single lighting assembly 130 includes multiple light sources. In one such embodiment, the multiple light sources of a single lighting assembly are arranged in an array, such as a linear array.

FIG. 11 shows an exploded view of an exemplary lighting assembly 130 in the form of an exemplary 3-optic array in a linear format. The exemplary lighting assembly array 130 consists of three light sources/LEDs 132, soldered to a metal core printed circuit board 134. To the back of the metal core printed circuit board 134 is attached a heat sink 136 via six mounting screws 138, which also mount and secure three optic elements 185. Each optic element 185 is provided in a shape and material so as to direct light as desired, e.g., principally off-axis from an axis of the LED 132 and/or an axis normal to the printed circuit board 134. In this exemplary embodiment, the optic elements 185 are of free-form optic design, in this case, somewhat teardrop-shaped and asymmetrical, to direct the light principally downwardly from the mounting point for the device. This causes the emitted light from each LED to be focused and redirected downward to illuminate either single areas or distributed areas along a path of egress. Linear format of arrays allows the use of either a common optic element or different optic designs with common or distributed aim points, to improve illumination efficiency.

Collectively, the elements described above comprise an optic assembly 144. The optic assembly 144 is mounted into a holder 148. The holder has an outer surface 149 that smoothly integrates with the contours of a remainder of the housing. In this exemplary embodiment, the holder 148 includes one respective opening 149 corresponding to each optic element 140, and one optic element 185 corresponding to each LED/light source 132.

It should be appreciated that other arrangements of light sources and lenses may be used. For example, a single light source may be used rather than 3 as shown, or a single optical element may be used for multiple light sources in other embodiments, or the light sources and/or optical elements may be arranged in a multi-dimensional (e.g., 2×2) array, or multiple light sources may be arranged in a pattern other than an array, or without any pattern. Additionally, the light sources may be arranged out of plane relative to one another, e.g., on multiple flat printed circuit boards, or on a single circuit board but not in a plane. Any suitable arrangement involving one-to-one or one-to-many arrangements of light sources, optic elements, and holder openings may be employed.

In this exemplary embodiment, the holder 148 further includes a lip 147 extending outwardly from the holder, toward the rear of the device relative to the optic elements 185. This lip 147 serves as a light shield and or reflector to limit or prevent washing of the wall (or ceiling), to which the device is mounted, with light travelling rearwardly from the optic elements.

Referring again to FIGS. 1-7 and 12-18, the emergency lighting device 200 is shown completely assembled, with a linear format lighting assembly array 130 on each side, and with the lighting assembly 130 in a retracted position in which the first carriage 112 is rotated to a sideways-facing position, and the second carriage is not tilted. Notably, the front surface 220 of the device is substantially smooth and continuous and the main housing 100 is free from any openings for accommodating a light source or lens, and the lighting assemblies are positioned on the sides of the device, or movable to positions within the envelope of the housing, and thus the device 200 does not have the "bug eye" look common to prior art emergency lighting devices.

Further lighting assemblies 130 are integrated into the side edges of the lighting device 200 housing to minimize the size and volume of the device, particularly when in the compact/retracted position as shown in FIGS. 1-7. This also makes the lighting device 200 more aesthetically pleasing for use in office and business environment.

Additionally, the lighting device 200 is also capable of providing an illuminated path of egress that is adjacent and parallel to the mounting wall. More particularly, the lighting assemblies are mounted on a movable structure, including rotatable first carriage 112 and tiltable second carriage 120, permitting the light sources to not only be retracted as shown in FIGS. 1-7, but also to be in one or more extended positions.

Figure 12:
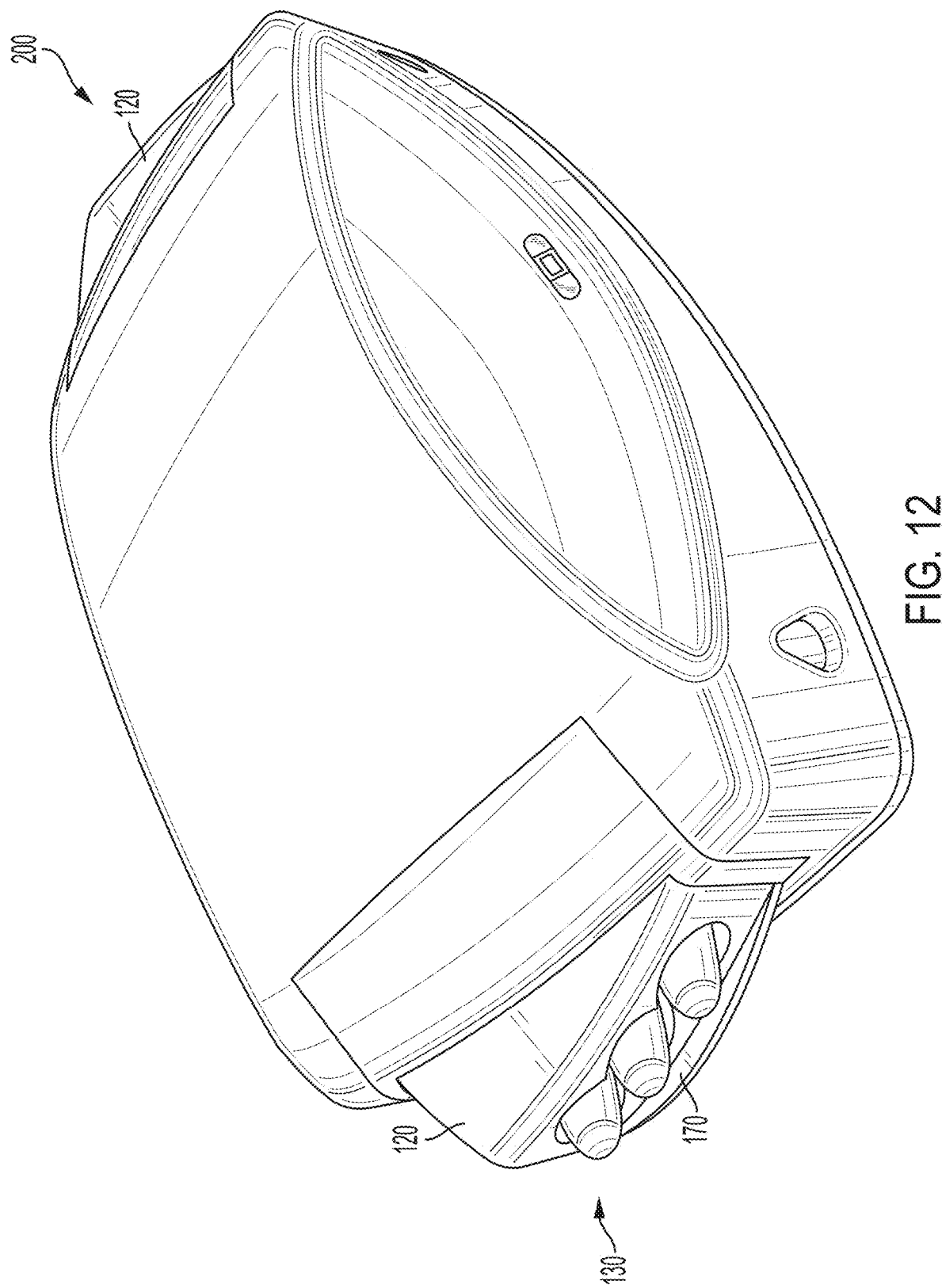
FIG. 12 is a perspective front view of the lighting device of FIG. 1, showing the lighting array in a tilted position in which the lighting array is extended from the housing.
Figure 13:
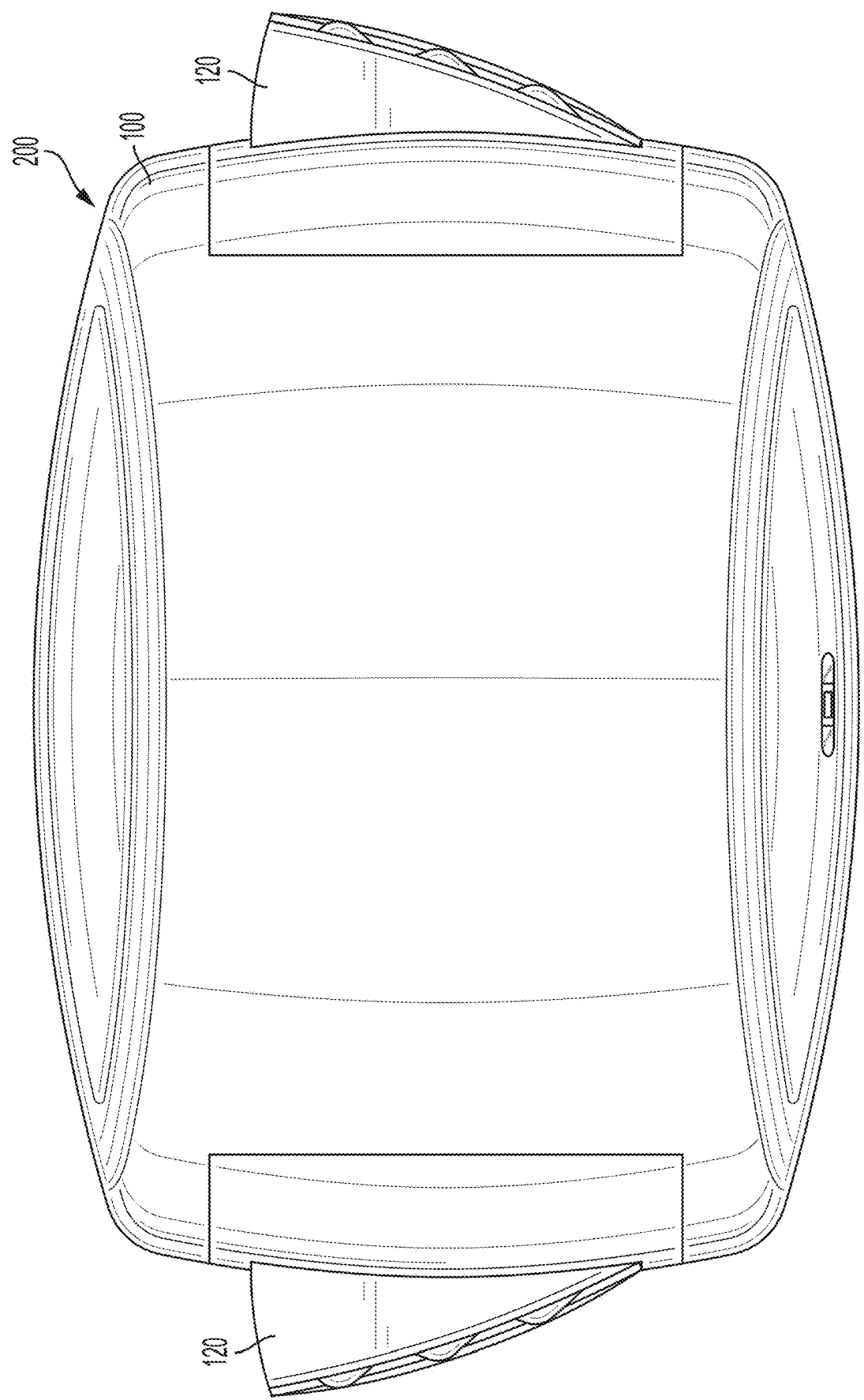
FIG. 13 is a front view of the lighting device as shown in FIG. 11.

FIGS. 12 and 13 show the lighting device 200 in a first extended position, namely one in which each of the first carriages 112 is not rotated, so that one or both of the lighting assemblies 130 remains in a sideways-facing position, but the second carriages 120 are tilted (extended/tilted). In this arrangement, the lighting assemblies are particularly well-suited to illuminating the path of egress beneath the location at which the lighting device 200 is mounted, e.g., to provide enhanced uniformity of lighting along a path of egress in front of/parallel to the mounting surface.

Figure 14:
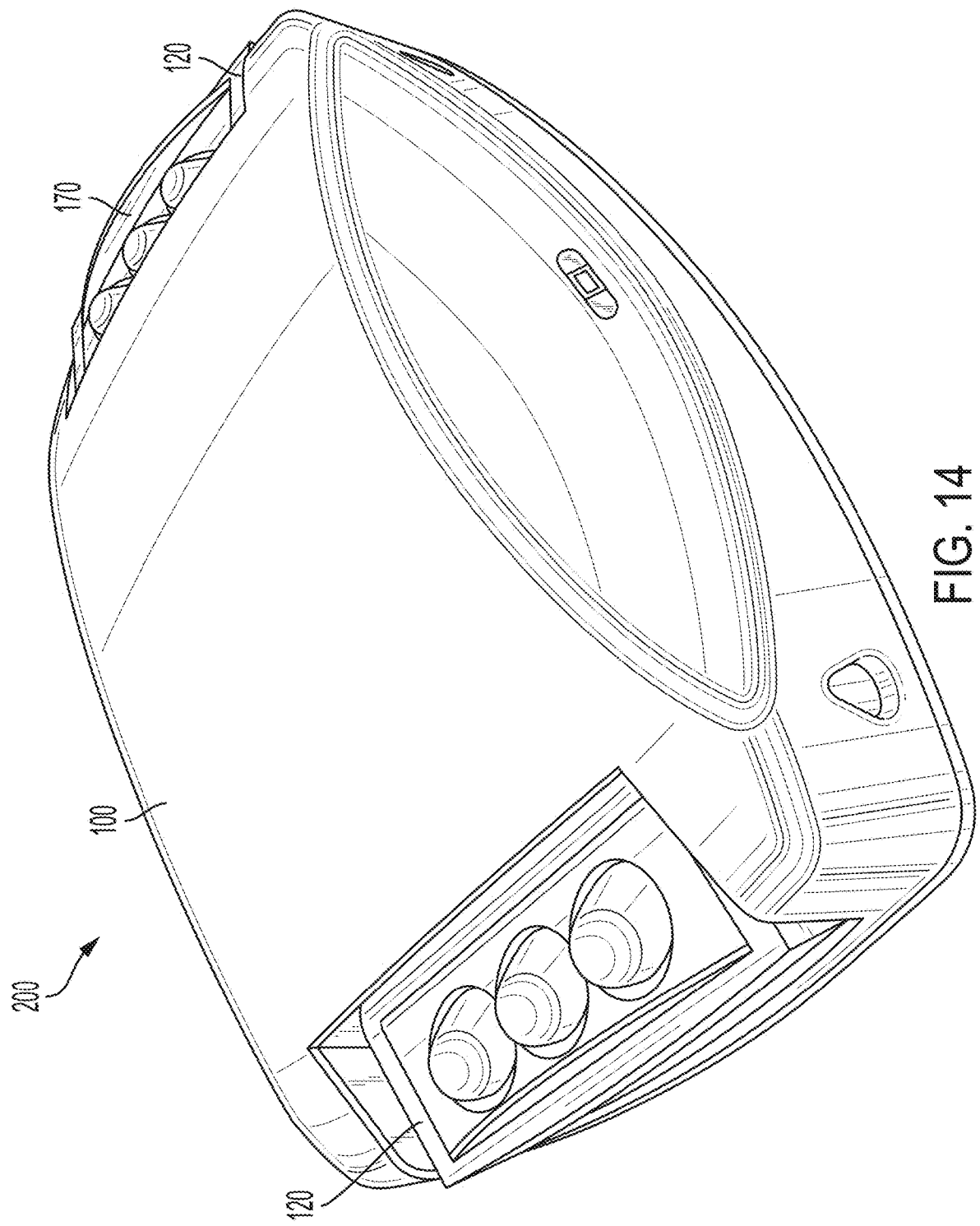
FIG. 14 is a perspective front view of the lighting device of FIG. 1, showing the lighting array in a rotated into a forward-facing position.
Figure 15:
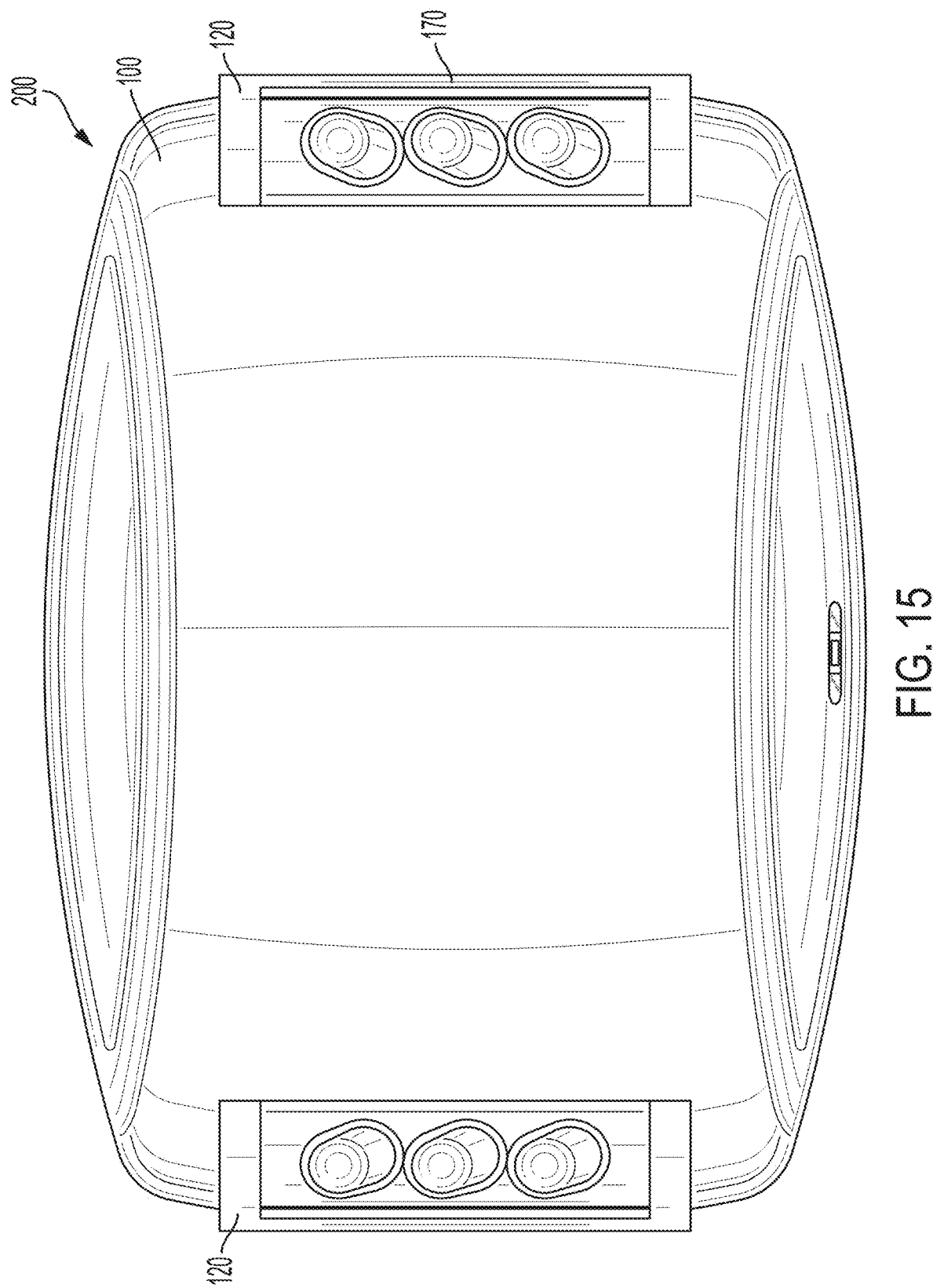
FIG. 15 is a front view of the lighting device as shown in FIG. 13.

FIGS. 14 and 15 show the lighting device 200 in a second extended position, namely one in which each of the first carriages 112 is rotated such that the lighting assemblies 130 are in more forward-facing positions, but the second carriages 120 are not tilted (extended/rotated). In this arrangement, the lighting assemblies are particularly well-suited to illuminating the path of egress in front of the location at which the lighting device 200 is mounted, e.g., to provide enhanced uniformity of lighting along an illuminated path of egress perpendicular to the mounting wall.

Figure 16:
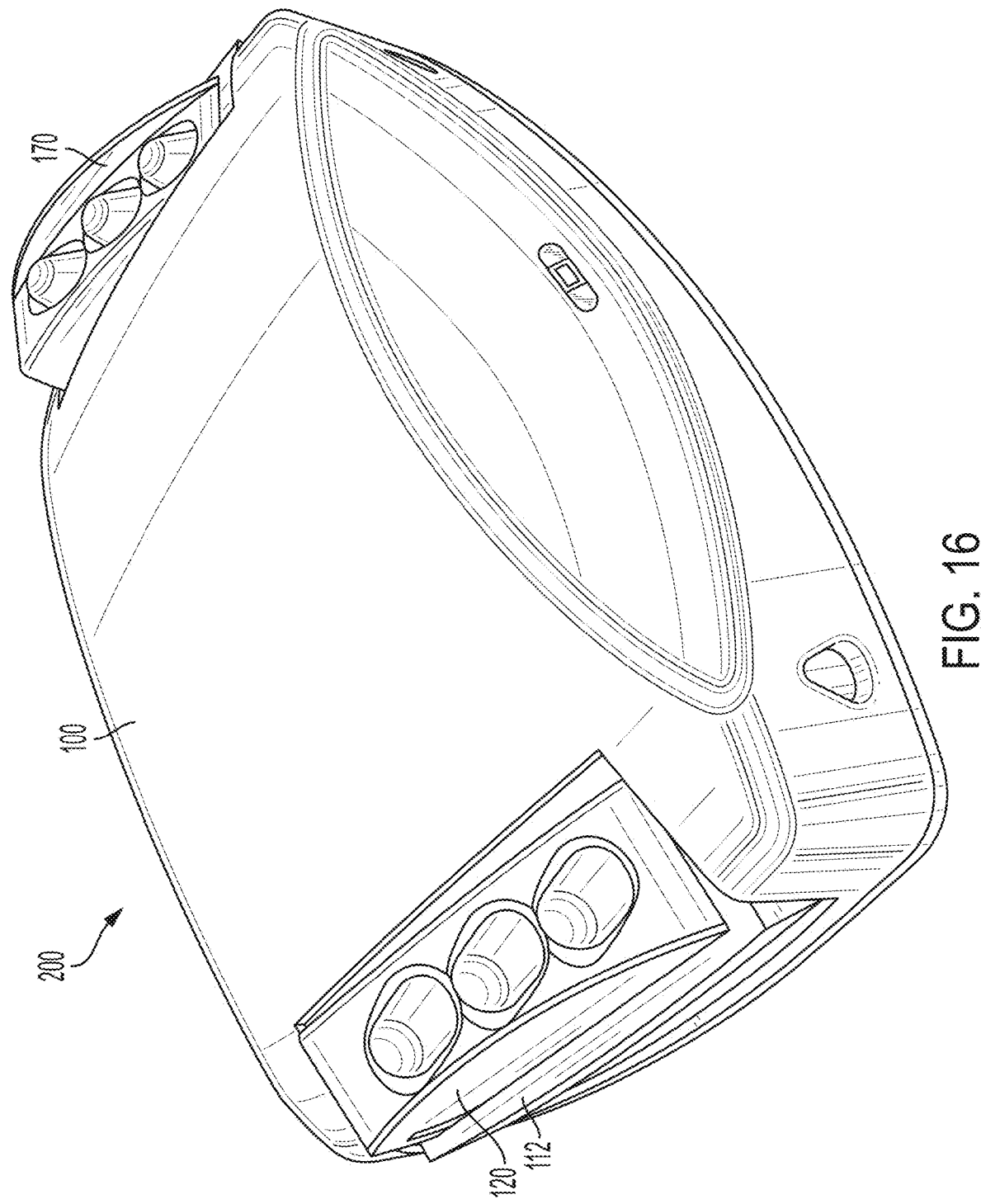
FIG. 16 is a perspective front view of the lighting device of FIG. 1, showing the lighting array in a tilted and rotated position.
Figure 17:
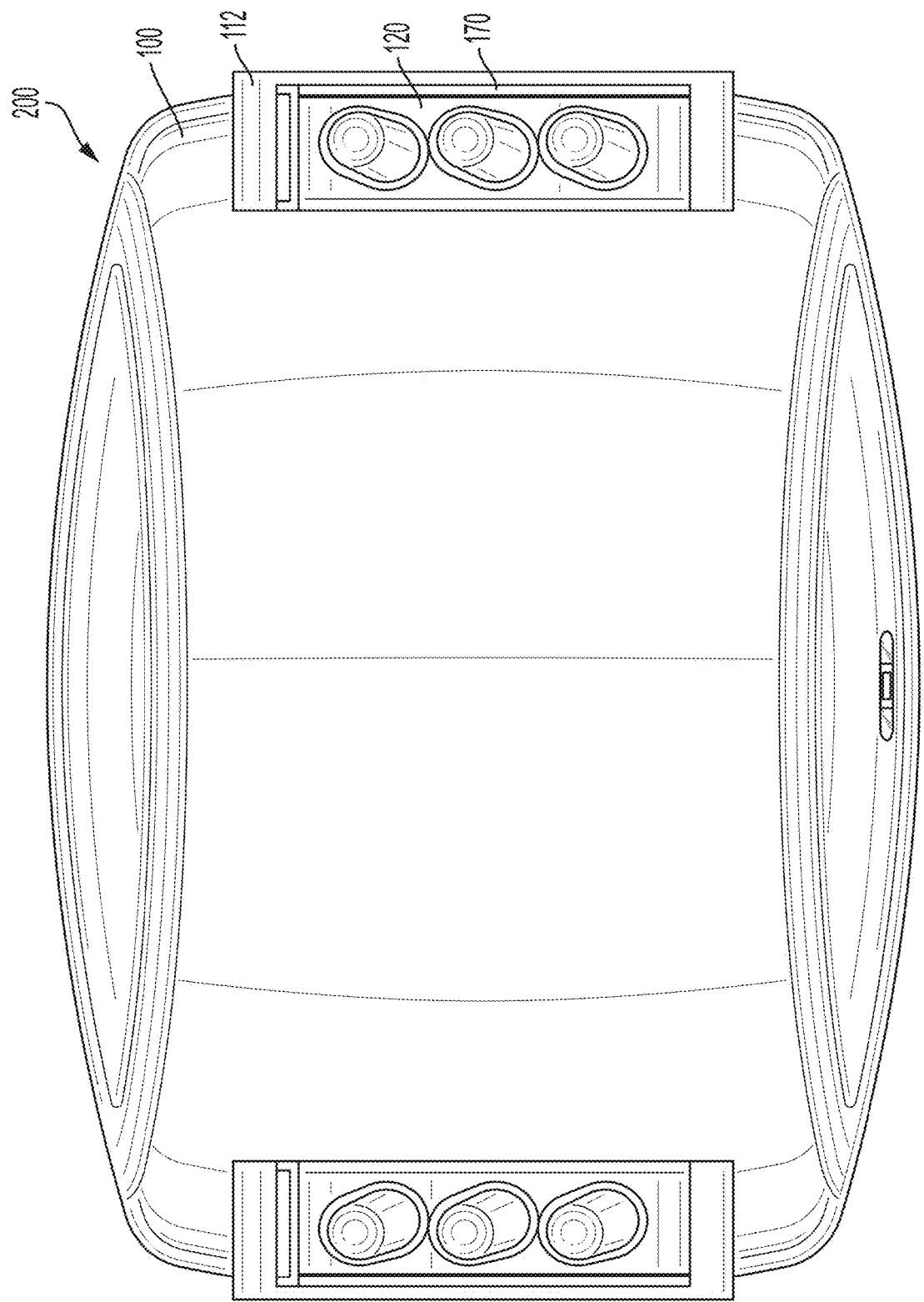
FIG. 17 is a front view of the lighting device as shown in FIG. 15.
Figure 18:
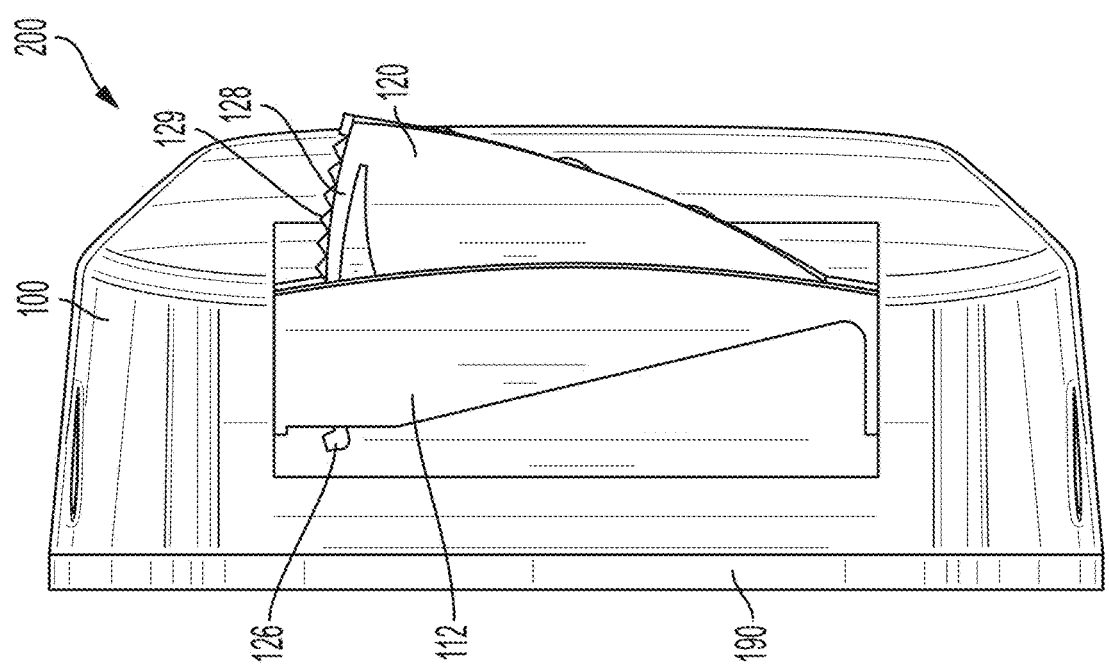
FIG. 18 is a left side view of the lighting device as shown in FIG. 15.

FIGS. 16-18 show the lighting device 200 in a third extended position, namely one in which each of the first carriages 112 is rotated such that the lighting assemblies 130 are in more forward-facing positions, and the second carriages 120 are also tilted (extended/rotated and tilted). In this arrangement, the lighting assemblies are particularly well-suited to illuminating the path of egress both beneath and in front of the location at which the lighting device 200 is mounted.

Further, it will be appreciated that each of the first and second carriage may be rotated or tilted independently of the other, and to any degree within its range of motion. Thus, emergency lighting device provides for adjustability of the lighting elements to provide enhanced uniformity of lighting coverage, while still providing high luminous efficiency over large areas and spacings to obtain uniform path of egress lighting. Accordingly, a single device can accommodate a broad range of lighting needs, but tilting and turning will not often be needed, and thus the particularly compact size and shape of the device associated with maintenance of the tilting and turning mechanisms in their retracted state can be preserved in most installations.

Referring now to FIGS. 7, 8, and 10, the lighting device 200 can be assembled by mounting the various components into the main housing 100. This includes mounting the lighting assemblies 130 to the second carriages 120, mounting the second carriages 120 to the first carriages 112, e.g., by flexing the first carriages 112 so that the pivot pins 122 of the second carriages 120 seat in the corresponding openings/slots 126 of the first carriages 112, and then flexing the shields 60 to mount the first carriages 112 into the shields 60, and then mounting the shields 60 into the housing 100, which may be fastened by press fit, matable connectors, latches, fasteners or other suitable means.

Referring now to FIGS. 7 and 8, the mounting plate 190 can then be mounted to a wall or ceiling of a building where path of egress illumination is desired using screws passing through holes in the mounting plate 190. An electrical connector 196 of the mounting plate can then be permanently or semi-permanently hardwired to AC wiring of the building in which it is mounted during an initial installation of the lighting device in the building.

The circuit board 50 of the main housing 100 may include an electrical connector 55 having contacts for mating with a complementary electrical connector on the mounting plate 190 to form an electrical connection to mains power. Accordingly, the main housing 100 may then be mounted to the mounting plate 190, with the fingers or other mounting members and openings or other mounting structures of the mounting plate 190 and housing 100 registering with each other to cause the electrical connectors to mate to form appropriate electrical connections, and to form a mechanical connection between the mounting plate 190 and housing 100 capable of supporting the housing 100 on the mounting plate 190, and thus on the wall or ceiling in the desired location.

Subsequently, the device 200 may be disassembled without disturbing this hardwired connection, e.g., by pressing the mounting members 198 to release them from their openings 188, and permit the housing 100 to be removed from the mounting plate 90.

The lighting assemblies 130 can then be left in the closed/retracted positions as shown in FIGS. 1-7, or their spatial orientations may be adjusted as needed to provide the desired path of egress lighting. The spatial orientation of each lighting assembly 130 can be adjusted by manually grasping each second carriage 120 by its respective lip 147 and tilting each second carriage 120, and/or rotating the first and second carriages 112, 120 in combination, as desired for the desired lighting effect.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An emergency lighting device comprising:
   a mounting plate;
   a main housing complementary to said mounting plate and matable therewith to define an enclosure;
   a support assembly housed within said main housing and adjustably turnable about a translatable first axis, and separately tiltable about a second axis extending transversely to the first axis; and
   a lighting assembly comprising at least one light source mounted to said support assembly to be turnable about the first axis and separately tiltable about the second axis; and
   an electrical circuit positioned within said enclosure and configured for receiving AC from building mains power and providing electrical power to illuminate said at least one light source.

2. The emergency lighting device of claim 1, wherein said lighting assembly and said at least one light source are positioned on a side of said main housing, and said main housing has a front surface that is substantially smooth and continuous and free from any openings for accommodating a light source or lens.

3. The emergency lighting device of claim 1, wherein no more than a minor portion of the device's lighting assembly is visible from a front view of the device, when said support assembly is in a retracted position.

4. The emergency lighting device of claim 1, wherein said support assembly comprises:
   a shield mounted to said main housing;
   a first carriage turnably mounted to said shield; and
   a second carriage tiltably mounted to said first carriage.

5. The emergency lighting device of claim 1, wherein each light source comprises a linear array of at least two LEDs provided on a common mounting plane defined by a common printed circuit board.

6. The emergency lighting device of claim 5, wherein each lighting assembly further comprises a free-form optic element corresponding to each light source, each free-form optic element being supported on each respective lighting assembly in position to focus and redirect light emitted by a corresponding LED.

7. The emergency lighting device of claim 6, wherein a plurality of optic elements corresponding to a plurality of LEDs are combined into an unitary optical array.

8. The emergency lighting device of claim 1, wherein said support assembly permits the lighting assembly to adjustably tilt by at least 10 degrees about the second axis.

9. The emergency lighting device of claim 1, wherein said support assembly permits said lighting assembly to be adjustably turnable by about 90 degrees around the first axis, from a retracted position in which said lighting assembly is sidewards-facing, to a rotated position in which said lighting assembly is forward-facing.

10. The emergency lighting device of claim 1, wherein said electrical circuit comprises:
   a back-up battery to power the device upon loss of building mains power; and
   a printed circuit board comprising an AC to DC converter to charge said battery, drive said at least one light source of said lighting assembly, and control device operation.

11. The emergency lighting device of claim 1, further comprising:
   a shield supported on the device to provide a physical non-conductive barrier protecting a user from physical contact with a conductive portion of the device.

12. The emergency lighting device of claim 1, wherein said mounting plate defines a plurality of at least one of an opening and a knockout for making an opening for mounting said mounting plate to a surface.

13. The emergency lighting device of claim 12, wherein said mounting plate comprises an electrical connector configured for hardwiring to mains building AC wiring of the building during an initial installation of the device in the building.

14. The emergency lighting device of claim 13, wherein said housing comprises a plurality of mounting structures, and wherein said mounting plate further comprises a corresponding plurality of mounting members formed as cantilevered fingers disposed in positions to register with and mate with said mounting structures of said housing to interlock said housing with said mounting plate.

15. The emergency lighting device of claim 1, wherein said lighting assembly is supported in a holder defining a lip extending outwardly from said holder as a light shield to block light travelling from said lighting assembly rearwardly in a direction of said mounting plate.

16. An emergency lighting device comprising:
   a mounting plate;
   a main housing complementary to said mounting plate and matable therewith to define an enclosure;
   a support assembly supported on said main housing, said support assembly providing three degrees of freedom, the three degrees of freedom comprising turning about a first axis, translation relative to a second axis as said support assembly is turned, and tilting about a third axis orthogonal to the first axis; and
   a lighting assembly comprising at least one light source mounted to said support assembly to be turnable about the first axis and separately tiltable about the third axis; and
   an electrical circuit positioned within said enclosure and configured for receiving AC from building mains power and providing electrical power to illuminate said at least one light source.

17. The emergency lighting device of claim 16, wherein said lighting assembly and said at least one light source are positioned on a side of said main housing, and said main housing has a front surface that is substantially smooth and continuous and free from any openings for accommodating a light source or lens.

18. The emergency lighting device of claim 16, wherein said support assembly comprises:
   a shield mounted to said main housing;
   a first carriage turnably mounted to said shield; and
   a second carriage tiltably mounted to said first carriage.

19. The emergency lighting device of claim 16, wherein each light source comprises a linear array of at least two LEDs provided on a common mounting plane defined by a common printed circuit board.

20. The emergency lighting device of claim 16, wherein each lighting assembly further comprises an optic element corresponding to each light source, each optic element being supported on each respective lighting assembly in position to focus and redirect light emitted by a corresponding LED.

21. The emergency lighting device of claim 16, wherein said support assembly permits said lighting assembly to adjustably tilt by at least 10 degrees about the second axis.

22. The emergency lighting device of claim 16, wherein said support assembly permits said lighting assembly to be adjustably turnable by about 90 degrees around the first axis, from a retracted position in which said lighting assembly is sidewards-facing, to a rotated position in which said lighting assembly is forward-facing.

23. The emergency lighting device of claim 16, wherein said housing comprises a plurality of mounting structures, and wherein said mounting plate further comprises a corresponding plurality of mounting members formed as cantilevered fingers disposed in positions to register with and mate with said mounting structures of said housing to interlock said housing with said mounting plate.

24. The emergency lighting device of claim 16, wherein said lighting assembly is supported in a holder defining a lip extending outwardly from said holder as a light shield to block light travelling from said lighting assembly rearwardly in a direction of said mounting plate.

25. An emergency lighting device comprising:
   a mounting plate;
   a main housing complementary to said mounting plate and matable therewith to define an enclosure;
   a support assembly comprising:
      a first carriage supported on said main housing to permit turning of said first carriage about a first axis that is generally vertical when the device is mounted to a generally vertical wall;
      a second carriage supported on said main housing to permit tilting of said second carriage about a second axis orthogonal to the first axis;
   a lighting assembly comprising at least one light source mounted to said support assembly; and
   an electrical circuit positioned within said enclosure and configured for receiving AC from building mains power and providing electrical power to illuminate said at least one light source.

26. The emergency lighting device of claim 25, wherein said first carriage is mounted for rotation-like motion about the first axis in which the first axis translates relative to said housing as said first carriage is turned.

27. The emergency lighting device of claim 26, wherein said first carriage is provided with complementary mating structures that cause said first carriage to translate as it is rotated about the first axis.

28. The emergency lighting device of claim 27, wherein said complementary mating structures comprise a pair of eccentrically located pins extending from upper and lower ends of said first carriage, and a corresponding pair of elongated contoured slots defined in main housing, each of said pair of elongated slots being dimensioned to receive a corresponding one of said pair of pins.

29. The emergency lighting device of claim 25, wherein said second carriage is tiltably mounted to said first carriage.

30. The emergency lighting device of claim 29, wherein said second carriage is tiltably mounted to said first carriage by a pair of pivot pins sharing a common axis.

31. The emergency lighting device of claim 30, wherein said second carriage comprises a cantilevered finger defining a catch for permitting, but limiting, tilting of said second carriage relative to said first carriage.

32. The emergency lighting device of claim 31, wherein said cantilevered finger defines a plurality of structures that engage with said first carriage to define a plurality of detents permitting adjustment of said second carriage to a desired position, and retention of said second carriage in said desired position.

33. The emergency lighting device of claim 31, wherein said second carriage is provided with visually perceptible markings corresponding to a plurality of different tilt positions corresponding to said plurality of detents.

* * * * *